(12) United States Patent
Romero et al.

(10) Patent No.: US 9,290,670 B2
(45) Date of Patent: Mar. 22, 2016

(54) CONDUCTIVE METALLIC COATING MATERIAL, METHOD OF CORROSION PREVENTION WITH CONDUCTIVE METALLIC COATING MATERIAL, AND METHOD OF CORROSION-PREVENTIVE REPAIR THEREWITH

(75) Inventors: Fabinia H. Romero, Yokohama (JP);
Yoshiko Nishijima, Yokohama (JP);
Haruo Hamaki, Tokyo (JP); Shinji Sato, Ashikaga (JP); Taro Niki, Tokyo (JP); Yasunori Motegi, Ashikaga (JP)

(73) Assignees: ALPHA KOGYO K.K., Kanagawa (JP);
OILES CORPORATION, Tokyo (JP)

( * ) Notice: Subject to any disclaimer, the term of this patent is extended or adjusted under 35 U.S.C. 154(b) by 898 days.

(21) Appl. No.: 13/266,032

(22) PCT Filed: Apr. 21, 2010

(86) PCT No.: PCT/JP2010/057061
§ 371 (c)(1),
(2), (4) Date: Jan. 16, 2012

(87) PCT Pub. No.: WO2010/123028
PCT Pub. Date: Oct. 28, 2010

(65) Prior Publication Data
US 2012/0114845 A1    May 10, 2012

(30) Foreign Application Priority Data
Apr. 22, 2009   (JP) .................. 2009-104448

(51) Int. Cl.
*C09D 5/24* (2006.01)
*H01B 1/22* (2006.01)
*C09D 5/10* (2006.01)

(52) U.S. Cl.
CPC  *C09D 5/24* (2013.01); *C09D 5/103* (2013.01);
*H01B 1/22* (2013.01)

(58) Field of Classification Search
CPC ............. C09D 5/10; C09D 5/24; C09D 7/12;
C09D 201/00; B05D 5/00; H01B 1/22
USPC ........................................... 427/142; 252/512
See application file for complete search history.

(56) References Cited

U.S. PATENT DOCUMENTS

2009/0155598 A1*   6/2009   Bierwagen et al. ........... 428/418

FOREIGN PATENT DOCUMENTS

| JP | 01-301241 | 12/1989 |
|----|-----------|---------|
| JP | 04-068141 B2 | 10/1992 |

(Continued)

OTHER PUBLICATIONS

European search report application for EP Appl. No. 10767085.3-1217 / 2423268 dated Sep. 28, 2012; 6 pages.

(Continued)

*Primary Examiner* — Mark Kopec
*Assistant Examiner* — Danny N Kang
(74) *Attorney, Agent, or Firm* — Renner, Kenner; Arthur M. Reginelli

(57) ABSTRACT

Provided is a highly versatile conductive metallic coating material which is free from the limitation related to a facility without handling complication, and which can maintain its anticorrosive action for a long period. Specifically provided is a conductive metallic coating material which has an organic resin component and a metal component containing aluminum and magnesium and which exhibits a sacrificial anticorrosive reaction on iron. A content ratio of the metal component and the organic resin component is desirably 98:2 to 80:20 in terms of weight ratio. The conductive metallic coating material according to the present invention is usable for preventing corrosion of a building structure or a civil engineering structure and for repairing a corrosion proof treated surface of an existing building structure or a civil engineering structure.

13 Claims, 6 Drawing Sheets

(56) References Cited

FOREIGN PATENT DOCUMENTS

| | | |
|---|---|---|
| JP | 11-158415 | 6/1999 |
| JP | 2001-164194 A2 | 6/2001 |
| JP | 2001-164914 | 6/2001 |
| JP | 2005-014446 | 1/2005 |
| JP | 2007-146267 | 6/2007 |
| JP | 2005-126750 | 5/2015 |
| WO | WO2007-117270 A2 | 10/2007 |
| WO | WO 2007117270 A2 * | 10/2007 |

OTHER PUBLICATIONS

International Search Report.

* cited by examiner (a) (b)

(a)

(b)

(c)

(d)

(e)

(f)

(g)

(h)

(a)

(b)

(c)

(d)

(e)

(f)

(g)

(h)

(a)

(b)

(c)

(d)

(e)

(f)

(g)

(a)

(b)

(c)

(d)

(e)

(f)

(g)

CONDUCTIVE METALLIC COATING MATERIAL, METHOD OF CORROSION PREVENTION WITH CONDUCTIVE METALLIC COATING MATERIAL, AND METHOD OF CORROSION-PREVENTIVE REPAIR THEREWITH

This application claims the benefit of International Application Serial. No. PCT/JP2010/057061, filed Apr. 21, 2010, which claims the benefit of Japanese Patent Application Serial. No. JP2009104448, Apr. 22, 2009.

TECHNICAL FIELD

The present invention relates to an anticorrosive coating material for a steel material used in a building structure, a civil engineering structure and the like placed under a corrosive environment and a corrosion prevention method and an a corrosion prevention repair method with the anticorrosive coating material.

BACKGROUND ART

As methods for preventing corrosion with high durability in a building structure and in a civil engineering structure, there are hot-dip galvanization and a coating method with an inorganic zinc coating material or an organic zinc coating material, each of which prevents corrosion by causing a sacrificial anode reaction through a use of a potential difference from an iron substrate, a zinc containing metal spraying method and the like.

The hot-dip galvanization is used for an exterior part in particular, a roof and the like of a building structure and it is used in wide applications such as an upper structure (box girder) of a steel bridge, a bearing of a steel bridge, a support of a guardrail, a support of a road sign and the like in a civil engineering structure.

However, the hot-dip galvanization, which is although widely used for corrosion prevention, has the following drawback. Precisely, since a product to the hot-dip galvanization is normally immersed in a galvanizing bath in a factory, the product is limited in its size depending on the bath size, and thus, a large product cannot be treated. Further, since the galvanizing bath for the hot-dip galvanization has the temperature of 430° C. to 510° C., the product (steel material) suffers thermal deformation, which sometimes necessitates a correction work for ensuring flatness of the galvanized product. In addition, the correction work needs a careful attention to a crack and a damage of a galvanized surface.

Further, the hot-dip galvanization often uses distilled zinc as a commonly used zinc metal, but regarding the distilled zinc, it has been pointed out that cadmium and lead contained therein may be mixed in galvanization. Accordingly, the distilled zinc tends to be used so carefully according to the RoHS directive (Restricting the use Of Hazardous Substances) that has recently been widespread in European countries.

The coating methods with the inorganic zinc coating material and with the organic zinc coating material are also widely used as the sacrificial corrosion prevention method. Careful control should be paid for inorganic coating material to be prepared by such as blasting so as to ensure its adhesiveness of a product (steel material), because the inorganic coating material is lack of adhesiveness. In particular, corrosion proof performance were expected enough to equivalent to that of zinc plating, it would mandatory require to make a coating film should be thick, resulting in requiring to maintain adhesiveness for long term, however, it is really tough to be achieved. On the other hand, the coating using the organic zinc coating material where organic resin is used as a binder makes it possible to favorably ensure adhesiveness to a product (steel material) to be coated therewith, compared with the coating using the inorganic zinc coating material.

In addition to the above-described coatings with zinc-containing coating materials, there is a technique, in which zinc, aluminum, magnesium or the like exhibiting a sacrificial anode reaction on iron is sprayed so that a thermal spray metallic coating made of this material is formed on a metal body, as shown in Patent Literature 1, for instance. The thermal sprayed metal in this case only needs to exhibit the sacrificial anode reaction on iron as the metal body. Accordingly, favorable corrosion prevention can be achieved with any metal selected from a pure metal, an alloy or a pseudo alloy.

In the art to prevent corrosion by thermally spraying the metal material exhibiting the sacrificial anode reaction, melted metal is just sprayed with a thermal spraying gun at high temperature so as to adhere on a product surface, which has been treated by blasting or by a power tool in advance. Therefore, unlike the aforesaid hot-dip galvanization, since the temperature of the product does not become high, thermal deformation of the metal body can be favorably prevented. In addition to this, the product is not limited in size, because there is not a plating bath, which would cause such limitation.

However, even in the thermal spraying, molten metal such as aluminum or magnesium, which is thermally sprayed with the thermal spraying gun, needs to be sprayed preferably, at a right angle to a sprayed surface. This makes it difficult to do this work at a narrow space where the thermal spraying gun cannot be used or at a worksite where cylinders of gases or power sources necessary for the thermal spraying cannot be brought.

Therefore, as a versatile method for sacrificial corrosion prevention of iron, a method with zinc as a sacrificial anticorrosive component has been widely executed. However, the use of zinc has a problem that it requires refining and the like because a raw material ore contains lead and cadmium. Further, zinc can be said to be a preferable material in view of its capability of quickly exhibiting a sacrificial anode reaction on an iron substrate, but on the other hand, because of its quick elution, its durability does not last so long, which has given rise to a problem that frequent maintenance such as repairing is required in order to prevent corrosion by maintaining the sacrificial anode reaction stably for a long period. Therefore, there is a necessity for a technique with a metal, which is capable to exhibit a sacrificial anticorrosive reaction that is sufficient to the same degree as zinc does and which is able to keep durability of a product.

Patent Literature 2 discloses a technique, in which particulates of metal or an alloy in the form of aerosol having sacrificial corrosion protection is sprayed to a steel material surface to form a coating film. Further Patent Literature 2 describes that the metal or the alloy having the sacrificial corrosion protection preferably contains one kind or two or more kinds selected from zinc, aluminum and magnesium.

However, the technique disclosed by Patent Literature 2 is to form the coating film by making the particulates of the metal or the alloy in the aerosol form collide with the steel material surface by spraying the particulates to a surface for corrosion prevention. So, this technique requires an aerosol spraying facility (including an aerosol chamber, a classification chamber, an injection nozzle, a gas generating chamber, a film forming chamber, a vacuum pump) as well as inert gas such as helium or nitrogen. Therefore, on-site formation of the coating film cannot be easily executed also in this technique.

Incidentally, Patent Literature 3 discloses a composition for powder coating (powder baking coating), in which a to 900 parts by weight zinc powder is compounded with 100 parts by weight epoxy resin. This is just to provide a powder baking coating material and also requires a specific facility. That is to say, such coating cannot be easily executed.

CITATION LIST

Patent Literatures

Patent Literature 1: Japanese Patent Application Laid-open No. 2005-126750
Patent Literature 2: Japanese Patent Application Laid-open No. 2007-146267
Patent Literature 3: Japanese Patent Application Laid-open No. H 11-158415

SUMMARY OF INVENTION

Technical Problem

In consideration of the above-described problems of the conventional arts, it is an object of the present invention to provide a conductive metallic coating material, which is usable without any limitation related to a facility such as a hot-dip galvanizing bath, which can prevent deformation of a metal body due to high-temperature input heat unlike hot-dip galvanization, which can, even if it does not use zinc, cause an anticorrosive action on the metal body by sacrificial anode reaction that is sufficient to the same degree as zinc does or more, and which can be easily applied not only in factory execution but also in on-site execution without requiring any large facility, and to provide a corrosion prevention method and a corrosion prevention repair method with the conductive metallic coating material.

Solution to Problem

[Invention According to Claim 1]

An invention according to claim 1 provides a conductive metallic coating material, which is composed mostly of a metal component having a sacrificial anticorrosive action on iron and an organic resin component, comprising aluminum and magnesium contained as the metal component.

(Operation and Effect)

As a metal causing a sacrificial anticorrosive action, zinc exhibiting a high sacrificial anticorrosive reaction has been conventionally in wide use, but zinc has a problem of environmental pollution by lead and cadmium contained in its raw material ore, a problem about durability of corrosion proof performance, and so on. It has been found out that, when both of aluminum and magnesium are used instead of zinc, they exhibit a sacrificial anticorrosive reaction that is sufficient to the same degree as zinc does and high durability of corrosion proof performance, which attains the present invention providing a sacrificial anticorrosive coating material.

FIG. 1 schematically show the outline of a sacrificial anticorrosive reaction in a crosscut portion of an iron substrate coated with aluminum and magnesium. A reaction speed of the sacrificial anticorrosive reaction of magnesium (Mg) is as high as that of zinc and thus it elutes earlier than the iron substrate (FIG. 1(a)), so that a film of magnesium oxide, magnesium hydroxide, or the like is formed to cover the iron substrate (FIG. 1(b)). Though the iron substrate itself is slightly oxidized and elutes, the elution of iron can be stopped when it elutes only slightly because the magnesium (Mg) film is formed earlier so as to cover the iron substrate. Aluminum (Al) has a property of being retained on an iron surface for a long period though its reaction speed is slower than that of magnesium (Mg). The eluted aluminum (Al) forms a film of aluminum oxide or the like, which further covers the iron surface and magnesium (Mg) covering the iron surface so as to protect them for a relatively long period (FIG. 1(c)). Therefore, using the metal component in which aluminum (Al) and magnesium (Mg) are combined makes it possible to obtain a conductive metallic coating material having high sacrificial corrosion proof performance and durability.

In the present invention, the sacrificial corrosion prevention method, using the organic metallic coating material containing the organic resin component, can be applied by using a brush, a roller, a spatula, a trowel, or the like without requiring any special facility or machine, compared with hot-dip zinc galvanization and metal spraying which have been conventionally used. This allows corrosion proof treatment on a narrow space where thermal spraying cannot be conventionally performed.

[Invention According to Claim 2]

An invention according to claim 2 provides the conductive metallic coating material according to claim 1, wherein as the metal component, a mixed powder of an aluminum powder and a magnesium powder, an aluminum-magnesium alloy powder, or both of the mixed powder and the alloy powder are contained in the coating material.

(Operation and Effect)

As the metal component, the metallic coating material according to claim 2 can contain aluminum and magnesium in the form of their respective powders (as the mixed powder), in the form of aluminum-magnesium alloy powder or in the form of mixture of the above mixed powder and the above alloy powder. Then, the mixed powder is more preferable because it has an advantage that individual properties of aluminum and magnesium can exhibit respectively and easily and manufacturing cost can be reduced.

The smaller grain sizes the aluminum powder and the magnesium powder have, the better dispersibility to the organic resin component they can have, which makes it possible to produce a uniform state free from the segregation of the metal component in the metallic coating material. Further, when the aluminum powder and the magnesium powder have small grain sizes, a surface area of metal becomes large, resulting in high reactivity of a sacrificial anticorrosive reaction. However, since these metal powders, especially, the magnesium powder is highly inflammable, if the grain size of the metal power is too small, dust explosion will occur resulting in danger in a manufacturing process. Granularity of the metal powder is set to 75 mesh under more preferably, 100 mesh under and still more preferably, 200 mesh under within a range not causing the above manufacturing problem.

[Invention According to Claim 3]

An invention according to claim 3 provides the conductive metallic coating material according to claim 1 or 2, wherein a content ratio of aluminum and magnesium of the metal component is 5:95 to 70:30 in terms of weight ratio.

(Operation and Effect)

In the composition of the metal component contained in the conductive metallic coating material, the content ratio of aluminum and magnesium in terms of weight ratio is preferably 5:95 to 70:30, more preferably 5:95 to 50:50. As previously described, magnesium has high reactivity and elutes early, while aluminum has relatively high stability. Therefore, blending of a larger amount of magnesium enables to maintain the anticorrosive action of magnesium highly in long term. In addition, the content of aluminum is preferably 5% or more in terms weight ratio so that aluminum can be stable for long term.

Further, as a result of intensive study, it has been found that a content ratio of aluminum and magnesium is 35:65 to 15:85, more preferably 30:70 to 15:85, still more preferably 30:70 to 20:80, in terms of weight ratio so that the conductive metallic coating material satisfies both the high is performance of anticorrosive action and the anticorrosion stability.

[Invention According to Claim 4]

An invention according to claim 4 provides the conductive metallic coating material according to claim 1, wherein a compounding ratio of the metal component and the organic resin component is 98:2 to 80:20 in terms of weight ratio after curing.

(Operation and Effect)

When the compounding ratio of the metal component and the organic resin component is 98:2 to 80:20 in terms of weight ratio and this ratio can is adjusted appropriately within this range, it is possible to control flow of the conductive coating material according to the present invention to a desired degree. Depending on flowability of the coating material to be used, it is possible to select a coating method such as coating with a brush, coating with a roller or a coating with a trowel according to the situation of a worksite so that the compounding ratio of the metal component and the organic resin component can be adjusted. When the compounding ratio of the organic resin component is over 20 in terms of weight ratio, most of a surface of the metal component is covered by a nonconductive resin component, it is difficult for the metal component to fully exhibit performance of the anticorrosive reaction. The compounding radio of the organic resin component is preferably as small as possible so that the metal component of the conductive metallic coating material can exhibits its own property in high efficiency. In spite of this, when the weight ratio of the organic resin component is less than 2, flowability and adhesiveness to a target object cannot be obtained resulting in that the coating material cannot exhibit its own function.

Regarding the organic resin component, the use of organic resin component with particularly low viscosity allows a reduction in the compounding ratio of the organic resin component down to about 2%, which is makes it possible for the metal component of the conductive metallic coating material to efficiently exhibit its own property.

[Invention According to Claim 5]

An invention according to claim 5 provides a corrosion prevention method with a conductive metallic coating material, which is composed mostly of a metal component having a sacrificial anticorrosive action on iron and an organic resin component, comprising coating a building structure or a civil engineering structure made of iron with the conductive metallic coating material containing aluminum and magnesium as the metal component.

(Operation and Effect)

In the corrosion prevention method with the conductive metallic coating material, when aluminum and magnesium are used as the sacrificial anticorrosive metal, it is possible to directly perform the corrosion proof treatment even for a gigantic steadfast building on which hot-dip galvanization cannot be conventionally applied. Further, it is also possible to easily perform the corrosion proof treatment even for a narrow space and a worksite at a high place such as a bridge, where the metal spraying has been conventionally difficult.

[Invention According to Claim 6]

An invention according to claim 6 provides a corrosion prevention repair method with a conductive metallic coating material, which is composed mostly of a metal component having a sacrificial anticorrosive action on iron and an organic resin component, comprising applying the conductive metallic coating material containing aluminum and magnesium as the metal component to a corrosion proof treated surface of an existing building structure or a civil engineering structure.

(Operation and Effect)

In the corrosion prevention method with the conductive metallic coating material, when aluminum and magnesium are used as the sacrificial anticorrosive metal, it is possible to easily perform the repair work for the corrosion proof treated portion of a steadfast building or the like.

Advantageous Effects of Invention

According to the conductive metallic coating material of the present invention, it is possible to easily cause the sacrificial anticorrosive action and compared with an antirust specification using the sacrificial anode reaction of zinc, it is possible to obtain the same or higher level in an anticorrosive effect and higher durability, the application at a narrow space is also possible, a corrosion proof treatment of a structure can be executed without using any special large-scaled process or facility and an easy onsite work at a high place such as a bridge is possible.

Further, by changing the compounding ratio of the metal component and the resin component in the conductive metallic coating material according to the present invention, it is possible to select, in an actual execution, a coating method such as coating with a spray, coating with a brush, coating with a roller, or coating with a trowel. Additionally, it is also possible to appropriately select a compounding ratio according to an application manner. Further, since flowability of the coating material can be adjusted, even when there is a crack in a corrosion prevention target portion, the coating material can exhibit a function as putty filling the crack so as to be used as a corrosion prevention tool in a wide range.

In addition, containing no zinc, the conductive metallic coating material according to the present invention is not covered by the RoHS directive for an environmental influence evaluation. Therefore, when in use, no special measure is required so as to reduce burden of safety management.

DESCRIPTION OF EMBODIMENTS

Figure 1:
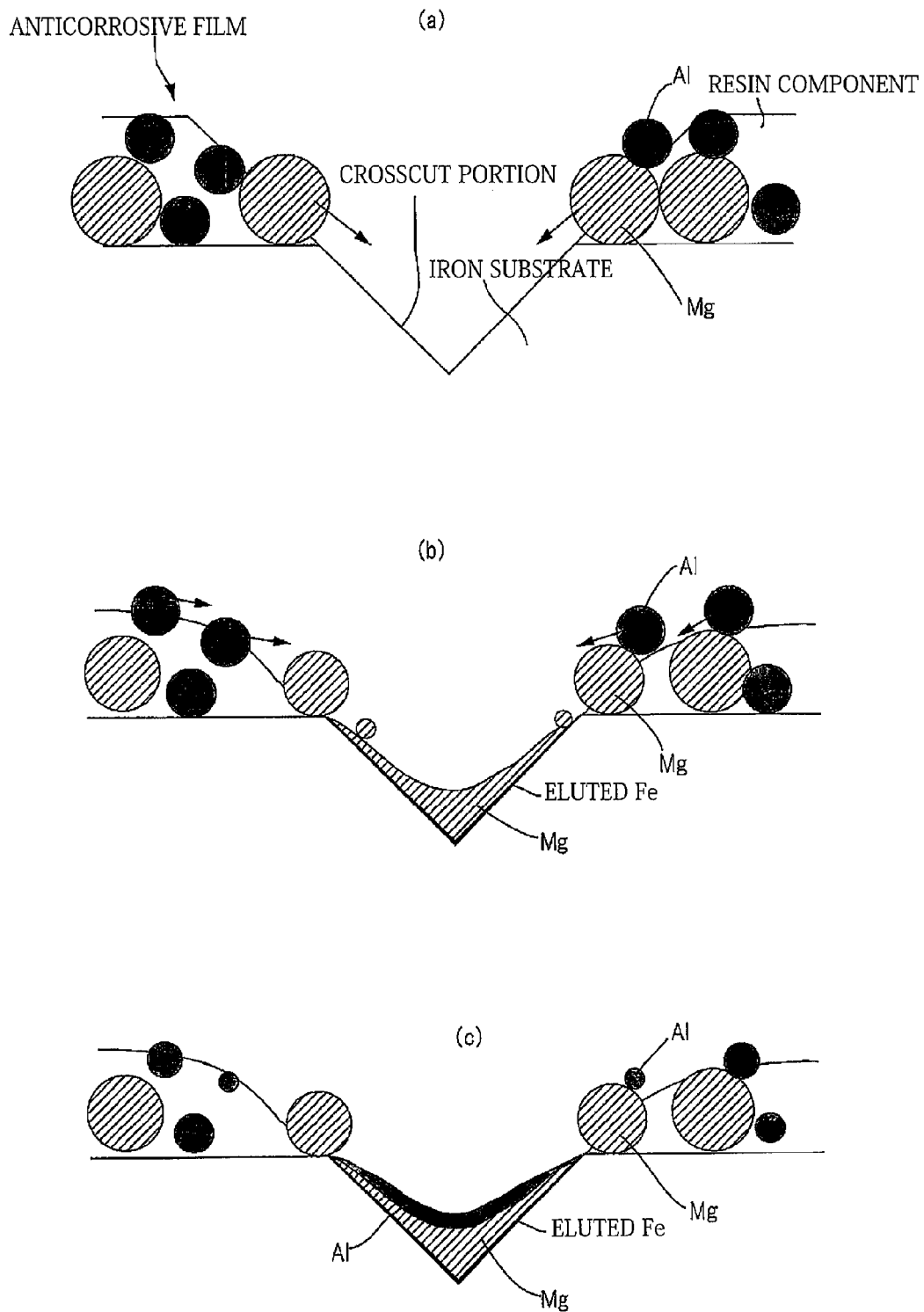
FIG. 1 are schematic views showing a mechanism for protecting an iron substrate by a coating material containing aluminum and magnesium FIG. 2 are photographs showing results of a CASS test, (a); example 4, (b); comparative example 6.

The present invention recites a conductive metallic coating material, which is composed mostly of a metal component having a sacrificial anticorrosive action on iron and an organic resin component. This coating material is usable for an unprocessed steel material, for a steel plate as well as for a steel material or a steel plate on which plating or any of various kinds of coating films is formed for the purpose of corrosion prevention. A film of the conductive metallic coating material of the present invention can also be formed on a primer formed on an unprocessed steel material or a steel plate. Further, in order to perform corrosion prevention repair, there is no limitation related to a coating material component on a surface to be coated with the conductive metallic coating material of the present invention.

The conductive metallic coating material of the present invention is composed mostly of the metal component having the sacrificial anticorrosive action on iron and the organic resin component, but since blending other components in a compounding ratio of about 5% or less in terms of weight ratio after curing does not cause any change in tendencies shown in later-described examples. Therefore, another metal component, preferably a metal having larger ionization tendency than iron, for example, zinc or a zinc-aluminum alloy can be blended, provided that its compounding ratio is about 5% or less in terms of weight ratio.

In the present invention, as the metal component, aluminum and magnesium are contained. They may be contained in the form of a mixed powder, in the form of an aluminum-magnesium alloy powder or in the form of mixture of the mixed powder and the alloy powder, as previously described.

A suitable range of the content ratio in terms of weight ratio of aluminum and magnesium is also as previously described.

As the organic resin component in the present invention, epoxy resin, especially, two-component epoxy resin is best suited. As the epoxy resin used in the present invention, any of various epoxy resins is usable without any specific limitation, provided that it is conventionally used as a coating material composition. Examples of such epoxy resin are bisphenol A, bisphenol F, bisphenol S, novolak glycidyl ether type, glycidyl ester type, glycidyl amine type, dicyclopentadiene skeleton type, biphenol type and the like. In view of balance between cost and performance, bisphenol A, phenol F, and novolak are suitable. In particular, resin composed mostly of bisphenol A is suitable because of its low melt viscosity.

An appropriate epoxy equivalent of the epoxy resin used in the present invention is normally 600 to 2000 g/equivalent, preferably 600 to 1500 g/equivalent. A curing agent is not particularly limited and any of various kinds of curing agents is usable, provided that it has been conventionally used as a curing agent as a composition of an epoxy resin-containing powder coating material. Examples of such a curing agent are: amine curing agents such as aromatic diamine e.g., DDM (diaminodiphenylmethane), a condensate of aliphatic amine and aliphatic dicarboxylic acid, polyamidoamine, dicyandiamide and imidazole; acid anhydrides such as a condensate of tetrahydrophthalic anhydride, benzophenonetetracarboxylic anhydride, trimellitic anhydride, pyromellitic anhydride and trimellitic ethylene glycol; acidic curing agents such as decandicarboxylic acid, isophthalic acid and acid-terminated polyester resin; Lewis acid metal complexes such as a boron trifluoride metal complex; a phenol-based compound having 1.5 or more phenolic hydroxyl groups per molecule on average; and the like. It is generally appropriate to use the curing agent so that its equivalent weight ratio to the epoxy resin becomes 0.2 or more.

In the coating material of the present invention, a conventionally used pigment may be blended when appropriate. Examples of such a pigment are a coloring pigment, an extender pigment and the like. Examples of the coloring pigment are metal complexes of titanium oxide, red iron oxide, iron oxide, quinacridone, carbon black, an azo compound, dioxane, threne and phthalocyanine and those mainly composed of their metallic salt. Examples of the extender pigment are barium sulfate, silicon dioxide, talc, calcium carbonate, potassium titanate whisker, aluminum borate whisker, wollastonite, aluminum oxide, asbestos, ceramic powder and the like. Further, an antirust pigment such as strontium chromate is also usable. Other additives can also be blended. As such additives, usable are, for example, a leveling agent, a pigment dispersing agent, a thixotropic agent, a surface tension reducing agent and the like. The pigments and additives of these kinds can be blended, provided that a compounding ratio thereof is about 3% or less in terms of weight ratio after curing.

In the present invention, instead of the epoxy resin, urethane resin or acrylic resin may be used, provided that its adhesiveness and the dispersion of the metal component therein are favorable. Further, a composite resin component including these may be used.

A compounding ratio of the metal component and the organic resin component of the present invention is desirably 98:2 to 80:20 in terms of weight ratio after curing.

EXAMPLES

Test Example 1

Comparison with Conventional Arts

Conductive coating materials according to the present invention were produced and a corrosion proof performance test for comparison with conventional materials. Table 1 shows compositions and conditions of products according to the present invention as examples 1 to 5 and comparative examples 6A and 7A. In addition, Table 1 shows conditions of products as comparative examples 1 to 12 including the conventional products.

Aluminum and magnesium in the examples 1 to 5 and the comparative examples 1 to 4 are in the form of metal powder with granularity of 100 mesh under were used in both the examples 1 to 5 and the comparative examples 1 to 4 and as the organic resin, two-component epoxy resin (main agent: modified epoxy resin, curing agent: modified aliphatic polyamine) was used. Metal components having compounding ratio of the aluminum powder and the magnesium powder were set in three steps, that is, 50:50 (examples 1 to 4), 70:30 (example 5), and 95:5 (comparative examples 1 to 4) in terms of weight ratio were prepared and a compounding ratio of the metal component and the resin component was set to 95:5 to 85:15 in terms of weight ratio after curing.

In the comparative examples 6A, 7A, an alloy powder with granularity of 100 mesh under which was prepared so that a ratio of aluminum and magnesium became 50:50 was used as the metal component and a compounding ratio of the metal component and the resin component was set to 98:2 to 98:3 in terms of weight ratio after curing.

With the coating materials prepared as described above, a corrosion proof test was conducted in the following procedure. As the corrosion proof test, was adopted a CASS test (Copper-Accelerated Acetic Acid Salt Spray Test) method, which is one of accelerating tests. Conditions of the CASS test were set in conformity with JIS H 8502, that is, a test solution was prepared by adding cupric chloride (II) dihydrate to a acetic acid acidic sodium chloride solution (NaCl 50±5 g/L, $CuCl_2$ 0.205±0.015 g/L, pH=3.1 to (acetic acid acidic)), temperature in a test chamber was 50±2° C., a spray amount was 1.5±0.5 mL/h (80 $cm^2$), and the evaluation time was 92 hours. In the course of the test, samples were taken out from a CASS testing apparatus when 48-hour evaluation time passes and when 72-hour evaluation time passes for the purpose of checking the progress of surfaces of the samples in order to observe the samples for checking the progress.

A substrate material of each sample used in the CASS test was a SPCC steel material (JIS G 3141 cold-rolled steel plate and strip) having a shape of 70 mm×150 mm×1.6 mm thickness. Each sample surface to be coated was treated with abrasive grit blasting (surface preparation of ISO Sa3.0) with a grit being used as an abrasive, and a Sm/Rz ratio was set to 4.0 or less. After the surface preparation, each surface was coated by brush coating or trowel coating selectively depending on viscosity of the coating material so that a film thickness could be adjusted to be 150 μm to 360 μm after curing.

In order to prevent a corrosive liquid used in the CASS test from entering from an edge thereof in each sample, the whole rear surface and a 5 mm width portion from an edge of a surface exposed to the corrosive liquid were protected by an insulating material. A modified epoxy resin primer with a 100 μm thickness or more was applied as the insulating material.

In order to observe corrosion progress due to a defect or a scratch of the anticorrosive film on the surface exposed to the corrosive liquid in each sample, a crosscut was formed on the surface of the film by a method described in JIS H 8502 and the samples were subjected to the test.

In the comparative examples 5 to 12, an organic zinc primer, which is a commercially available anticorrosive coating material utilizing a sacrificial anode reaction; ("Nippe Zinky 8000HB" manufactured by Nippon Paint Co., Ltd.) (comparative examples 5, 6), an organic zinc paint ("Nippe Zinky Metal Grey" manufactured by Nippon Paint Co., Ltd.) (comparative examples 7, 8), a cold galvanizing agent (Zn content 95%, one-component epoxy resin, comparative examples 9, 10), and zinc-aluminum (zinc: 50, aluminum: 50) thermal spraying (without sealing, comparative examples 11, 12) were applied on SPCC steel materials in the same manner as in the examples, crosscuts were formed thereon and the CASS test was conducted under the same conditions. The coating film of each comparative example was assumed to have thickness in normal use.

In the evaluation of the CASS test, it was visually judged whether or not there is rust, coating exfoliation, or the like. Judgment criteria are as follows.

⊚: Almost no rust is observed

○: Minor rust is observed only in part of the crosscut portion

Δ: Minor rust is observed in the whole crosscut portion x: Conspicuous rust is observed in the crosscut portion, or rust is observed all over the crosscut portion and portions other than the crosscut portion.

Test results when a 92-hour test time passed are as shown in Table 1. In the coating materials according to the examples 1 to 4 in which the 50 wt % aluminum powder and the 50 wt % magnesium powder were mixed, a favorable anticorrosive effect was observed regardless of the ratio of the metal component and the resin component. In the coating material in which the 70 wt % aluminum powders and the 30 wt % magnesium powders were mixed, a favorable effect was also observed. On the other hand, in the coating materials according to the comparative examples 1 to 4 in which the 95 wt % aluminum powders and the 5 wt % magnesium powders were mixed, conspicuous rust was observed in the crosscut portion when 48 hours passed. Therefore, it is clearly indicated that the compounding ratio of magnesium should be higher than 5% in the metal component of the coating material in order to exhibit sufficiently the sacrificial anticorrosive effect.

TABLE 1

| Sample No. | weight ratio of metal component (wt %) | | ratio of metal component and resin component (wt %) | | surface preparation | film thickness (μm) | 92-hour CASS test evaluation |
| --- | --- | --- | --- | --- | --- | --- | --- |
| | aluminum powder | magnesium powder | metal component | resin component (epoxy-based) | | | |
| example 1 | 50 | 50 | 93.8 | 6.2 | blasting | 362 | ○ |
| example 2 | 50 | 50 | 93.8 | 6.2 | blasting | 366 | ○-⊚ |
| example 3 | 50 | 50 | 85.5 | 14.5 | blasting | 150 | ○ |
| example 4 | 50 | 50 | 85.5 | 14..5 | blasting | 299 | ⊚ |
| example 5 | 70 | 30 | 95.0 | 5.0 | blasting | 163 | ○ |
| comparative example 6A | aluminum-magnesium alloy powder (50:50) | | 98.0 | 2.0 | blasting | 181 | Δ-○ |
| comparative example 7A | aluminum-magnesium alloy powder (50:50) | | 97.0 | 3.0 | blasting | 279 | Δ |
| comparative example 1 | 95 | 5 | 94.8 | 5.2 | blasting | 208 | X |
| comparative example 2 | 95 | 5 | 94.8 | 5.2 | blasting | 286 | X |
| comparative example 3 | 95 | 5 | 87.8 | 12.4 | blasting | 125 | X |
| comparative example 4 | 95 | 5 | 87.6 | 12.4 | blasting | 233 | X |
| comparative example 5 | organic zinc primer | | zinc component 70.0% | | blasting | 11 | X |

TABLE 1-continued

| Sample No. | weight ratio of metal component (wt %) | | ratio of metal component and resin component (wt %) | | surface preparation | film thickness (μm) | 92-hour CASS test evaluation |
|---|---|---|---|---|---|---|---|
| | aluminum powder | magnesium powder | metal component | resin component (epoxy-based) | | | |
| comparative example 6 | organic zinc primer | | zinc component 70.0% | | blasting | 25 | X |
| comparative example 7 | organic zinc paint | | zinc component 71.6% | | blasting | 73 | Δ |
| comparative example 8 | organic zinc paint | | zinc component 71.6% | | blasting | 64 | X |
| comparative example 9 | cold galvanizing (ZRC) brush coating | | zinc component 95.0% | | blasting | 104 | swell on the whole antirust surface |
| comparative example 10 | cold galvanizing (ZRC) brush coating | | zinc component 95.0% | | blasting | 64 | swell on the whole antirust surface |
| comparative example 11 | zinc-aluminum thermal spraying | | — | | conductive primer | 149 | swell on the whole antirust surface |
| comparative example 12 | zinc-aluminum thermal spraying | | — | | conductive primer | 151 | swell on the whole antirust surface |

As the comparative examples 5, 6, the organic zinc primer and as the comparative examples 7, 8, the organic zinc paint were relatively favorable when 48 hours passed but rust occurred in each crosscut portion when 72 hours passed, which does not allow the sacrificial anode reaction there.

As the comparative examples 9, 10, the cold galvanizing agents caused swollen lumps on the whole surfaces exposed to the corrosive liquid so as to form many irregularities on the surfaces, which does not allow even determination of occurrence of a sacrificial anode reaction in the crosscut portions. This may be because the corrosive liquid permeated through the films so as to cause corrosion on the iron substrates located under the films.

Further, as the comparative examples 11, 12, the zinc-aluminum thermal spraying, similarly to the aforesaid samples using the cold galvanization, caused swollen lumps on the whole surfaces exposed to the corrosive liquid so as to form many irregularities on the surfaces, which does not allow determination of occurrence of a sacrificial anode reaction in the crosscut portions. This may be because the corrosive liquid permeated through the films due to no sealing in the thermal spraying so as to cause corrosion on the iron substrates located under the films. In any way, it was found that these comparative examples are not capable to clear the CASS test conditions.

Figure 2:
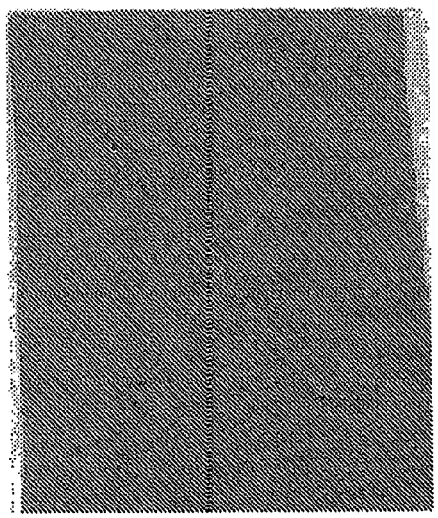
Figure 2:
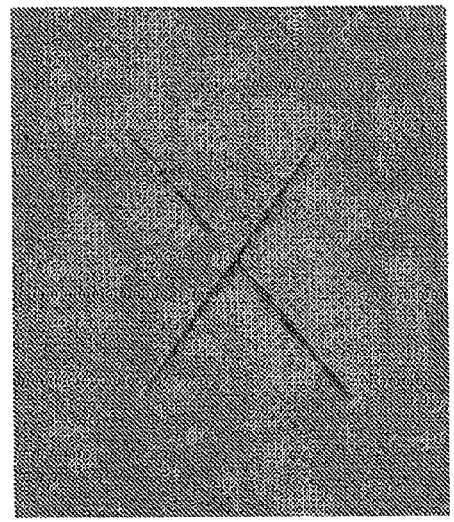

FIG. 2 show that, out of the samples subjected to the CASS test, the example 4 (in which 50 wt % aluminum powder and 50 wt % magnesium powder were mixed and their compounding ratio to the resin component was 85.5 wt %:14.5 wt %) and the comparative example 6 (organic zinc primer), exhibited favorable corrosion resistance when 92 hours passed.

Surface observation and surface elemental analysis with a scanning electron microscope (SEM) were conducted on a cross section of the crosscut portion of the example 4, which exhibited good corrosion resistance, out of the samples subjected to the CASS test. The result thereof is schematically shown in FIG. 1(c). Accordingly, it was confirmed that magnesium and aluminum covered and protected the surface of the iron substrate.

As the metal powders used in these examples and comparative examples, products with granularity of 100 mesh under were used, but they only need to be capable of being uniformly dispersed in the organic resin component, and they may have other granularity, provided that their dispersibility and safety are ensured.

Test Example 2

Study on Content Ratio of Aluminum and Magnesium in Metal Component

In order to study a suitable content ratio of aluminum and magnesium in the metal component, 10 kinds of metal mixed powders different in metal content ratio were prepared, and coating materials containing a 15% or 10% organic resin component were prepared. Aluminum and magnesium in the form of metal powder with granularity of 100 mesh under were used and the organic resin of two-component epoxy resin (main agent: modified epoxy resin, curing agent: modified aliphatic polyamine) was used. Content ratios (weight ratios) of the metal components and compounding ratios of the organic resin components (in terms of weight ratios after curing) in examples 8 to 21 and comparative examples 13 to 18 are as shown in Table 3.

The coating materials of the examples 8 to 21 and the comparative examples 13 to 18 were applied on samples, which had been treated with similar blasting to that of the test example 1 by brush coating or trowel coating so that their film thickness became about 100 to 500 μm after curing. Further, the whole rear surfaces and 5 mm-width portions from edges of surfaces exposed to a corrosive liquid were protected by insulating materials (modified epoxy resin primer: film thickness 100 μm or more). Further, crosscuts (JIS H8502: 1999) were formed on film surfaces, and the samples were subjected to the test.

Out of the coated samples, the examples 8, 9, 12 to 14, 15, 16, 19 to 21 and the comparative examples 13 to 18 were subjected to a corrosion proof test by the CASS test method and the examples 8 to 12, 15 to 19 and the comparative examples 13, 14, 16, 17 were subjected to the corrosion proof test by a combined cyclic corrosion test method. Because the CASS test method and the combined cyclic corrosion test method were conducted, corrosion proof performance can be evaluated more integratedly and variously.

In the CASS test method, the evaluation time was set to 360 hours. In the course of the test, the samples were taken out from a CASS testing apparatus when 24 hours passed and when 120 hours passed in order to observe sample surfaces for checking their progress. The test was conducted under the same conditions as those of the test example 1 except the evaluation time. The CASS test is often used for the evaluation of hot-dip galvanization and 96-hour evaluation time is recommended. In this evaluation, if there is no rust, exfoliation of the film or the like on a sample when 96 hours pass, the sample is generally evaluated as exhibiting a high protection effect against corrosion. Accordingly, it is indicated that in the CASS test for the present evaluation, a higher load is applied compared with the evaluation of the hot-dip galvanization.

The combined cyclic corrosion test method was conducted in conformity with JIS H 8502: 1999 by repeating steps of a cycle shown in Table 2. Brine was prepared by dissolving sodium chloride into a test solution so that its concentration became 50±5 g/L per 1 L of the test solution and so that the test solution had pH6.5. The evaluation time of the combined cyclic corrosion test was 360 hours (45 cycles) and the surface was observed in the course of the test when 24 hours (3 cycles) passed and when 120 hours (15 cycles) passed.

TABLE 2

| item | condition |
|---|---|
| 1. brine spraying | |
| a) temperature (° C.) | 35 ± 1 |
| b) NaCl concentration (g/L) | 50 ± 5 |
| 2. drying | |
| a) temperature (° C.) | 60 ± 1 |
| b) relative humidity % RH | 20 to 30 |
| 3. wetting | |
| a) temperature (° C.) | 50 ± 1 |
| b) relative humidity % RH | 95 or more |
| 4. time of steps in 1 cycle (h) | 8 in total (brine spraying 2, drying 4, wetting 2) |
| 5. time taken for shifting a step (min) | (including time taken for shifting a step) from spraying to drying; within 30 from drying to wetting; within 15 from wetting to spraying; within 30 |

Figure 3:
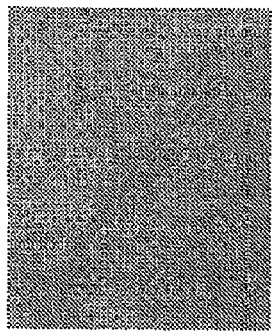
FIG. 3 are photographs showing results of the CASS test when 120-hour evaluation time passes. A correspondence relation is as follows: (a); comparative example 13, (b); comparative example 14, (c); example 8, (d); example 9, (e); example 12, (f); example 13, (g); example 14 and (h); comparative example 15.
Figure 3:
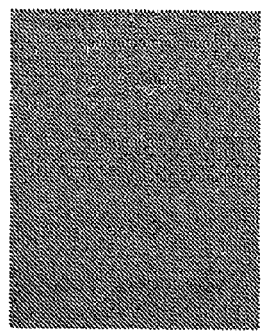
Figure 3:
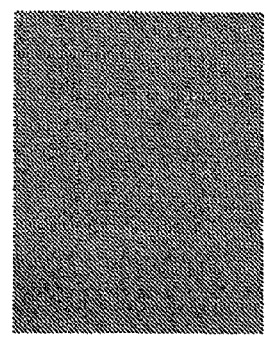
Figure 3:
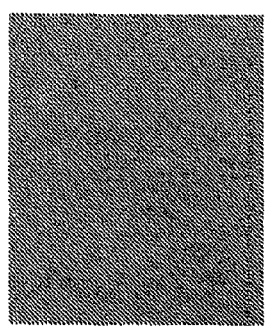
Figure 3:
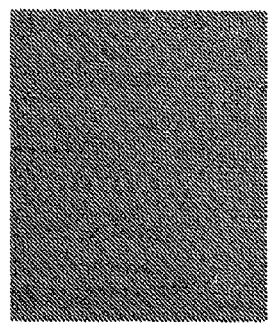
Figure 3:
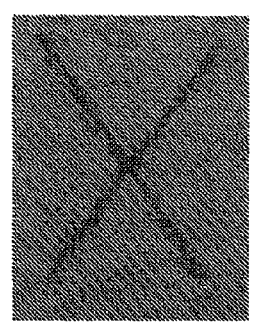
Figure 3:
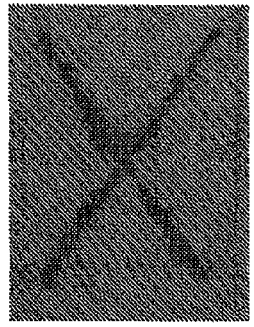
Figure 3:
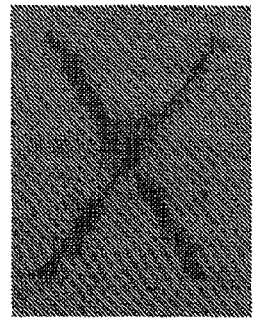
Figure 4:
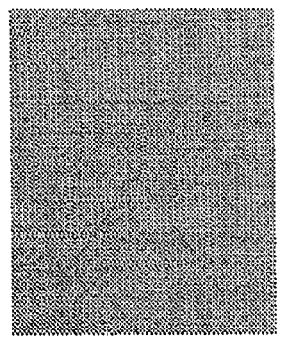
FIG. 4 are photographs showing results of the CASS test when 120-hour evaluation time passes. A correspondence relation is as follows: (a); comparative example 16, (b); comparative example 17, (c); example 15, (d); example 16, (e); example 19, (f); example 20, (g); example 21 and (h); comparative example 18.
Figure 4:
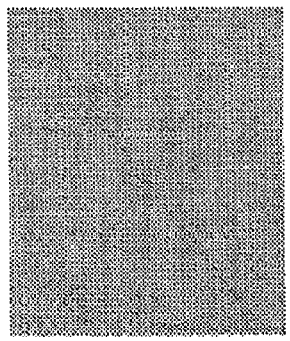
Figure 4:
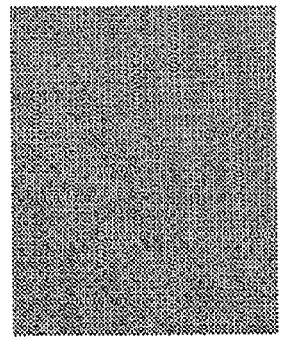
Figure 4:
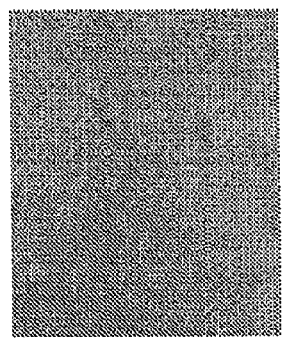
Figure 4:
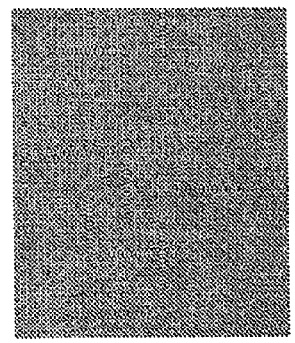
Figure 4:
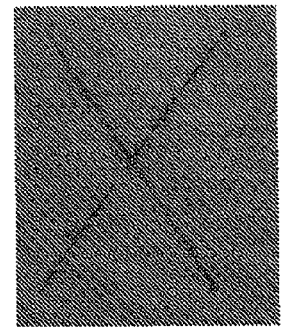
Figure 4:
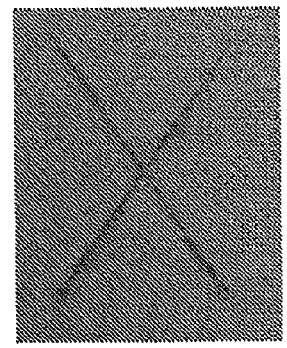
Figure 4:
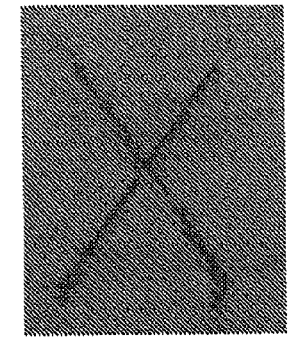
Figure 5:
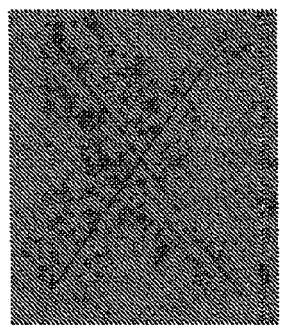
FIG. 5 are photographs showing results of a combined cyclic corrosion test when 360-hour evaluation time passes. A correspondence relation is as follows: (a) comparative example 13, (b) comparative example 14, (c) example 8, (d) example 9, (e) example 10, (f) example 11 and (g) example 12.
Figure 5:
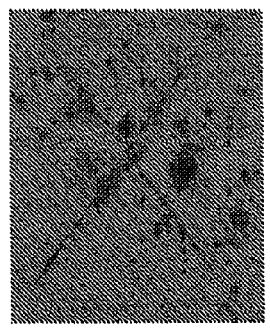
Figure 5:
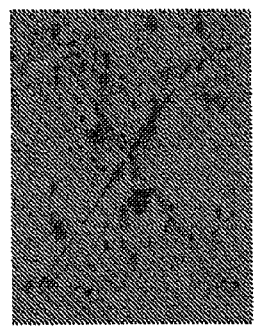
Figure 5:
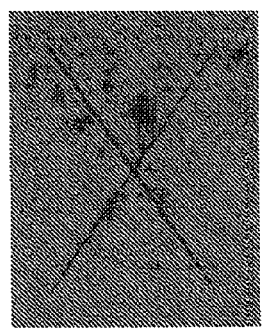
Figure 5:
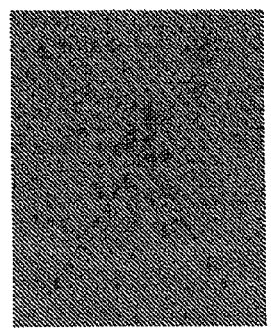
Figure 5:
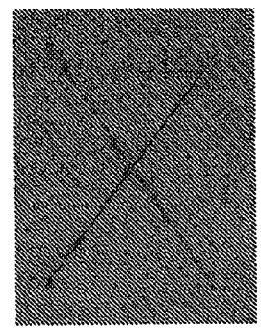
Figure 5:
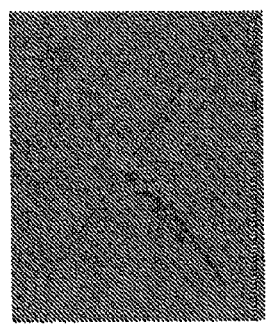
Figure 6:
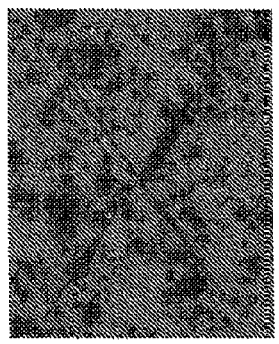
FIG. 6 are photographs showing results of the combined cyclic corrosion test when 360-hour evaluation time passes. A correspondence relation is as follows: (a); comparative Example 16, (b); comparative example 17, (c); example 15, (d); example 16, (e); example 17, (f); example 18 and (g); example 19.
Figure 6:
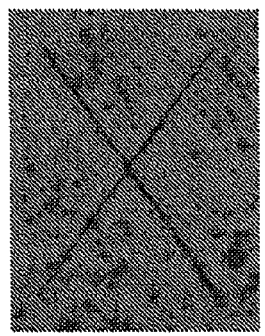
Figure 6:
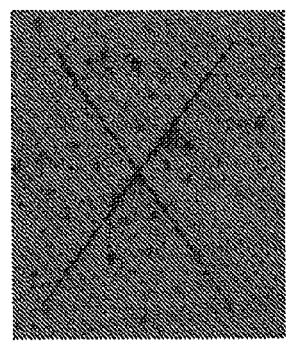
Figure 6:
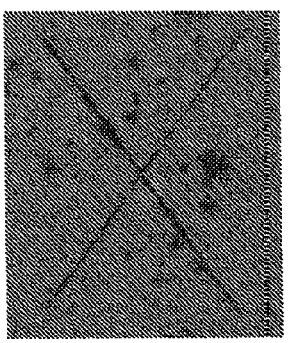
Figure 6:
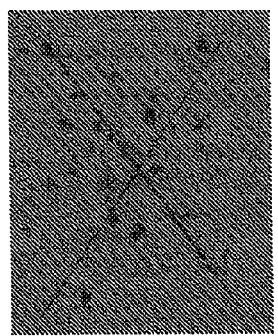
Figure 6:
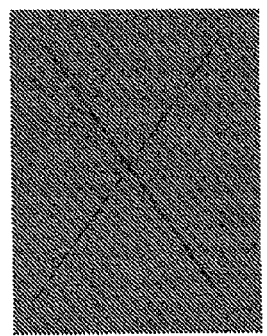
Figure 6:
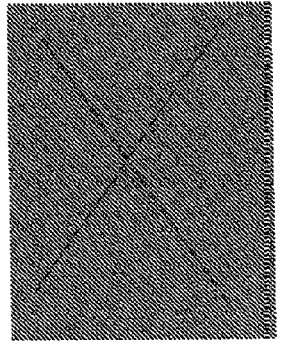

The evaluation of the CASS test and that of the combined cyclic corrosion test were conducted by visually judging the presence/absence of rust, the exfoliation of the coating or the like in the samples. Judgment criteria are the same as those of [Test Example 1]. Results of the CASS test and the combined cyclic corrosion test of the examples 8 to 21 and the comparative examples 13 to 18 are shown in Table 3. Further, photographs of crosscut portions of the respective samples in the CASS test when 120 hours passed are shown in FIG. 3 and FIG. 4, and photographs of crosscut portions of the respective samples in the combined cyclic corrosion test after 360 hours passed are shown in FIG. 5 and FIG. 6

TABLE 3

| sample No. | weight ratio of metal component (wt %) aluminum powder | weight ratio of metal component (wt %) magnesium powder | ratio of metal component and resin component (wt %) metal component | ratio of metal component and resin component (wt %) resin component (epoxy-based) | average film thickness (μm) | evaluation of CASS test 24 hr | evaluation of CASS test 120 hr | evaluation of CASS test 360 hr | evaluation of combined cyclic corrosion test 24 hr | evaluation of combined cyclic corrosion test 120 hr | evaluation of combined cyclic corrosion test 360 hr |
|---|---|---|---|---|---|---|---|---|---|---|---|
| comparative example 13 | 0 | 100 | 85 | 15 | 344 | ◎ | ◎ | ◎ | ◎ | ◎ | X-Δ |
| comparative example 14 | 2 | 98 | 85 | 15 | 210 | ◎ | ◎ | ◎ | ◎ | ◎ | X-Δ |
| example 8 | 5 | 95 | 85 | 15 | 200 | ◎ | ○-◎ | ○ | ◎ | ◎ | X |
| example 9 | 10 | 90 | 85 | 15 | 204 | ○-◎ | ○-◎ | ○ | ◎ | ◎ | X-Δ |
| example 10 | 15 | 85 | 85 | 15 | 232 | — | — | — | ◎ | ◎ | X-Δ |
| example 11 | 20 | 80 | 85 | 15 | 178 | — | — | — | ◎ | ◎ | Δ-○ |
| example 12 | 25 | 75 | 85 | 15 | 222 | ○-◎ | Δ-○ | Δ | ◎ | ◎ | Δ-○ |
| example 13 | 60 | 40 | 85 | 15 | 138 | Δ | X | X | — | — | — |
| example 14 | 70 | 30 | 85 | 15 | 133 | Δ | X | X | — | — | — |
| comparative example 15 | 80 | 20 | 85 | 15 | 106 | Δ | X | X | — | — | — |
| comparative example 16 | 0 | 100 | 90 | 10 | 396 | ◎ | ◎ | ◎ | ◎ | ◎ | X-Δ |
| comparative example 17 | 2 | 98 | 90 | 10 | 476 | ◎ | ◎ | ◎ | ◎ | ◎ | X-Δ |
| example 15 | 5 | 95 | 90 | 10 | 437 | ◎ | ◎ | ○-◎ | ◎ | ◎ | X |
| example 16 | 10 | 90 | 90 | 10 | 387 | ◎ | ◎ | ○-◎ | ◎ | ◎ | X-Δ |
| example 17 | 15 | 85 | 90 | 10 | 389 | — | — | — | ◎ | ◎ | Δ |
| example 18 | 20 | 80 | 90 | 10 | 415 | — | — | — | ◎ | ◎ | Δ-◎ |
| example 19 | 25 | 75 | 90 | 10 | 500 | ◎ | ◎ | ◎ | ◎ | ◎ | ◎ |
| example 20 | 60 | 40 | 90 | 10 | 230 | ○-◎ | Δ | X | — | — | — |
| example 21 | 70 | 30 | 90 | 10 | 188 | Δ | X | X | — | — | — |
| comparative example 18 | 80 | 20 | 90 | 10 | 160 | Δ | X | X | — | — | — |

* "—" no data

According to results, in the examples 13, 14, 21, in each of which, the magnesium content is small, rust occurred in the crosscut portions when 24 hours passed from the start of the CASS test, which indicates clearly that a coating material containing magnesium in a content ratio of more than 40 is suitable in order to fully exhibit the desired anticorrosive action. Further, in order to maintain such high anticorrosive action for long time in the combined cyclic corrosion test, the samples containing a larger amount of aluminum (examples 11, 12, 17 to 19) should be used.

From the results of this, it is understood that the following phenomenon is occurring on the surfaces of the samples. Precisely, when steel material coated with the conductive coating material is exposed to a severe condition such as acid precipitation, magnesium elutes early from a coating film to form a film on the whole surface of the steel material to exhibit its anticorrosive action. In case that an amount of magnesium is small, such early elution is not sufficient, which often causes insufficient protection of the steel material. Additionally, when a long time passes after the coating, most of magnesium elutes, so that remained magnesium on a steel material surface is reduced. Then, since aluminum elutes slowly, it takes a long time for aluminum to form a film on the whole surface of the steel material. When an amount of aluminum is small, conductivity of the film on the surface of the steel lowers as time passes after the coating so that a sufficient anticorrosive effect cannot be exhibited.

Therefore, the content ratio of aluminum and magnesium in the metal component of the conductive metallic coating material is preferably set to a balanced ratio with which the aforesaid properties of the both metals can be fully exhibited. As a result, it is clearly found that a suitable content ratio of aluminum and magnesium is 25:75 to 15:85.

Test Example 3

Study on Compounding Ratio of Organic Resin Component

In order to search a suitable compounding ratio of the organic resin component in the conductive metallic coating material, conductive metallic coating materials were prepared in which a content ratio of aluminum and magnesium in a metal component was 25:75, a compounding ratio of the metal component and an organic resin component in terms of dry weight was 90:10 (example 22), 85:15 (example 23), 80:20 (example 24), and 75:25 (comparative example 19), and 10%, (, 15, 20, 25, and 30% were contained. The coating materials of the examples 22 to 24 and the comparative examples 19, 20 were applied with brush coating or trowel coating on samples, which were blasted in a similar way in the test example 1 so that their film thickness became 300±50 μm after curing.

Surface resistivity of each sample was measured by a parallel-plate electrode method (Resistance HiTester 3541 manufactured by HIOKI E.E. Corporation). With regard to surface resistivity, values of the samples are shown in Table 4. With regard to the surface resistivity, the examples 22 to 24 presented small values of 60 to 70Ω but the comparative examples 19, 20 presented too high not to be measured.

From the result of this, it is clearly found that the compounding ratio of the organic resin component is preferably less than 20% in order to obtain sufficient conductivity in the metallic coating material.

TABLE 4

| sample No. | weight ratio of metal component (wt %) | | ratio of metal component and resin component (wt %) | | film thickness (μm) | conductivity surface resistivity (Ω) |
|---|---|---|---|---|---|---|
| | aluminum powder | magnesium powder | metal component | resin component (epoxy-based) | | |
| example 22 | 25 | 75 | 90 | 10 | 350 | 70.83 |
| example 23 | 25 | 75 | 85 | 15 | 326 | 62.59 |
| example 24 | 25 | 75 | 80 | 20 | 269 | 62.95 |
| comparative example 19 | 25 | 75 | 75 | 25 | 321 | — |
| comparative example 20 | 25 | 75 | 70 | 30 | 325 | — |

* "—" . . . Impossible to measure because the resistance value is over 100 MΩ

(Notes)

It has been found from the results of the experiments that the corrosion proof performance of the conductive metallic coating material depends on the thickness of the film, and the film thickness is desirably 150 μm or more, especially 200 μm or more, still more preferably 300 μm. Generally, it has been assumed to be 1500 μm or less.

In the above, as the organic resin, the two-component curable epoxy was used as the organic resin. However, even when commercially available urethane resin or acrylic resin was used, substantially the same results were obtained even though durability was slightly inferior.

Industrial Applicability

The conductive coating material according to the present invention is usable as an anticorrosive coating material for steel materials used in building structures or in civil engineering structures placed under a corrosive environment, and is also usable in all fields and all products requiring the corrosion proof treatment, such as vehicles and steel materials.

The invention claimed is:

1. A conductive metallic coating material, comprising of a metal component having a sacrificial anticorrosive action on iron; and an organic resin component,
   wherein the metal component is comprising mixed powder of an aluminum powder and a magnesium powder contained as the metal component, wherein a content ratio of aluminum and magnesium of the metal component is 5:95 to 70:30 in terms of weight ratio between the aluminum powder and the magnesium powder.

2. The conductive metallic coating material according to claim 1, wherein a compounding ratio of the metal component and the organic resin component is 98:2 to 80:20 in terms of weight ratio after curing.

3. A corrosion prevention method with a conductive metallic coating material, which is composed of a metal component having a sacrificial anticorrosive action on iron and an organic resin component, comprising coating a building structure or a civil engineering structure made of iron with the conductive metallic coating material, wherein the metal component is comprising mixed powder of an aluminum powder and a magnesium powder with a content ratio of the aluminum powder and the magnesium powder of the metal component being 5:95 to 70:30 in terms of weight ratio.

4. A corrosion prevention repair method with a conductive metallic coating material, which is composed of a metal component having a sacrificial anticorrosive action on iron and an organic resin component, comprising applying the conductive metallic coating material, wherein the metal component is comprising mixed powder of an aluminum powder and a magnesium powder with a content ratio of the aluminum powder and the magnesium powder of the metal component being 5:95 to 70:30 in terms of weight ratio, to a corrosion proof treated surface of an existing building structure or a civil engineering structure.

5. The conductive metallic coating material according to claim 1, wherein a grain size of the metal powder is set to 75 mesh under.

6. The conductive metallic coating material according to claim 1, wherein a grain size of the metal powder is set to 100 mesh under.

7. The conductive metallic coating material according to claim 1, wherein a grain size of the metal powder is set to 200 mesh under.

8. The corrosion prevention method with a conductive metallic coating material according to claim 3, wherein a grain size of the metal powder is set to 75 mesh under.

9. The corrosion prevention method with a conductive metallic coating material according to claim 3, wherein a grain size of the metal powder is set to 100 mesh under.

10. The corrosion prevention method with a conductive metallic coating material according to claim 3, wherein a grain size of the metal powder is set to 200 mesh under.

11. The corrosion prevention repair method with a conductive metallic coating material according to claim 4, wherein a grain size of the metal powder is set to 75 mesh under.

12. The corrosion prevention repair method with a conductive metallic coating material according to claim 4, wherein a grain size of the metal powder is set to 100 mesh under.

13. The corrosion prevention repair method with a conductive metallic coating material according to claim 4, wherein a grain size of the metal powder is set to 200 mesh under.

* * * * *